Sept. 11, 1928.

H. S. HUMPHREY 1,684,097

COMBINED DRAIN COCK AND RELIEF VALVE

Filed Sept. 8, 1927

INVENTOR
Herbert S. Humphrey
BY
Chappell & Earl
ATTORNEYS

Patented Sept. 11, 1928.

1,684,097

UNITED STATES PATENT OFFICE.

HERBERT S. HUMPHREY, OF KALAMAZOO, MICHIGAN, ASSIGNOR TO RUUD MANUFACTURING COMPANY, OF KALAMAZOO, MICHIGAN.

COMBINED DRAIN COCK AND RELIEF VALVE.

Application filed September 8, 1927. Serial No. 218,225.

The main object of this invention is to provide a combined drain cock and relief valve which is simple and compact in structure, one in which the relief valve is not likely to become clogged or inoperative and is durable in use.

Objects pertaining to details and economies of my invention will appear from the description to follow. The invention is defined in the claims.

A structure embodying the features of my invention is clearly illustrated in the accompanying drawing, in which.

Figure 1:
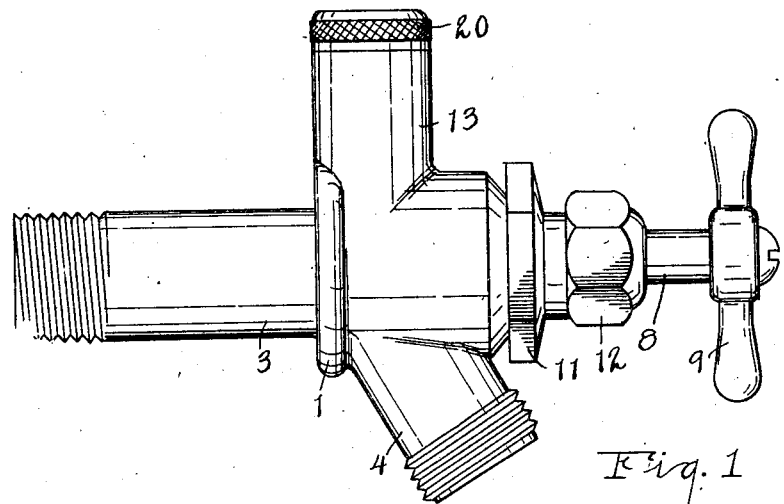
Fig. 1 is a side elevation of my improved combination valve.
Figure 2:
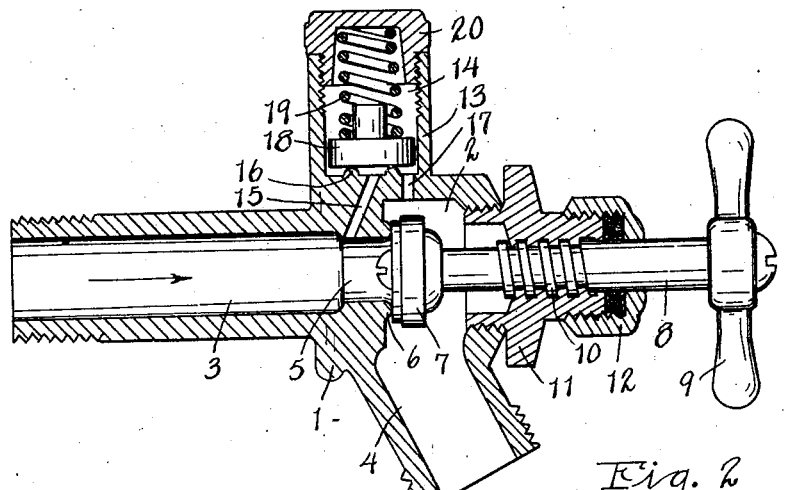
Fig. 2 is a vertical central section, the valve being shown in full lines for convenience in illustration.

Referring to the drawing, I provide a valve casing designated generally by the numeral 1 and having a main valve chamber 2, an inlet passage 3 and a discharge passage 4, the passages being formed in arms externally threaded to receive couplings. The passage 3 communicates with the main valve chamber through a port 5 surrounded by the annular raised valve seat 6. The main valve 7 is provided with a stem 8 having a hand piece 9, the stem being threaded at 10 into the cap 11. A packing gland 12 is provided for the stem.

At the side of the main valve chamber and opposite the discharge passage arm 4 the valve casing or body 1 is provided with an arm-like projection 13 providing a relief valve chamber 14, this valve chamber being connected to the inlet through the port 15 which opens centrally of the relief valve chamber 14. A raised valve seat 16 surrounds the port 15.

At the outside of this raised valve seat is a discharge port 17 for the relief valve chamber opening to the main valve chamber 2. The relief valve 18 is yieldingly urged to its seat by means of the coiled spring 19 adjustably supported by the cap 20 threaded into the relief valve chamber extension 13. The tension of the spring 19 is such as to resist normal predetermined pressures but will yield to excessive pressures.

My improvements are especially designed for use in relief valves of water heaters and are illustrated as I have embodied the same for such use. Other adaptations will, it is believed, be understood by those skilled in the art to which my invention relates.

Having thus described my invention what I claim as new and desire to secure by Letters Patent is:

1. In a valve structure of the class described, the combination of a casing having a main valve chamber provided with an inlet port and a relief valve chamber disposed at the side of said main valve chamber and having an inlet port opening centrally to said relief valve chamber and communicating with the inlet port of said main valve chamber, said relief valve chamber having a discharge port opening to said main valve chamber, said ports being surrounded by raised annular valve seats, a main valve coacting with said main valve chamber port and provided with a threaded stem in alignment with said inlet port, a relief valve coacting with said relief valve port, a spring acting to hold said relief valve to its seat, and means for adjusting said spring.

2. In a valve structure of the class descrbed, the combination of a casing having a main valve chamber provided with an inlet port and a relief valve chamber disposed at the side of said main valve chamber and having an inlet port opening centrally to said relief valve chamber and communicating with the inlet port of said main valve chamber, said relief valve chamber having a discharge port opening to said main valve chamber, a main valve coacting with said main valve chamber port and provided with a threaded stem in alignment with said inlet port, and a spring seated relief valve arranged in said relief valve chamber to coact with said relief port.

3. In a valve structure of the class described, the combination of a casing having a main valve chamber provided with an inlet port and a relief valve chamber disposed at the side of the main valve chamber and having an inlet port opening to said inlet port of said main valve chamber and a discharge port opening to said main valve chamber, a spring seated relief valve arranged in said relief valve chamber to coact with its said inlet port, and a main valve disposed in said main valve chamber and coacting with said inlet port and provided with a threaded stem in alignment with said inlet port.

In witness whereof I have hereunto set my hand.

HERBERT S. HUMPHREY.